US008165917B2

(12) United States Patent
Steigelfest

(10) Patent No.: US 8,165,917 B2
(45) Date of Patent: Apr. 24, 2012

(54) SYSTEM AND METHOD FOR SELLING TIME-BASED INVENTORY

(75) Inventor: David J. Steigelfest, New York, NY (US)

(73) Assignee: RBIDR, LLC, New York, NY (US)

( * ) Notice: Subject to any disclaimer, the term of this patent is extended or adjusted under 35 U.S.C. 154(b) by 1342 days.

(21) Appl. No.: 11/710,117

(22) Filed: Feb. 23, 2007

(65) Prior Publication Data

US 2007/0265933 A1 Nov. 15, 2007

Related U.S. Application Data

(60) Provisional application No. 60/799,998, filed on May 12, 2006, provisional application No. 60/850,167, filed on Oct. 5, 2006.

(51) Int. Cl.
*G06Q 30/00* (2012.01)
(52) U.S. Cl. .......................................... 705/26; 705/27
(58) Field of Classification Search ................. 705/26.1, 705/27.1, 26, 27
See application file for complete search history.

(56) References Cited

U.S. PATENT DOCUMENTS

| | | | |
|---|---|---|---|
| 6,430,603 B2 | 8/2002 | Hunter | 709/207 |
| 6,430,605 B2 | 8/2002 | Hunter | 709/207 |
| 6,850,901 B1 | 2/2005 | Hunter et al. | 705/26 |
| 7,134,132 B1 | 11/2006 | Ngo et al. | 725/34 |
| 2002/0095391 A1 | 7/2002 | Swart et al. | 705/418 |
| 2004/0192437 A1 | 9/2004 | Amaitis et al. | 463/26 |
| 2005/0267787 A1* | 12/2005 | Rose et al. | 705/5 |

OTHER PUBLICATIONS

"Airport Landing Slots Are Scarce, Yet Not Priced" on weblog Knowledge Problem, available at http://www.knowledgeproblem.com/archives/000700.html (Feb. 9, 2004), last accessed Mar. 28, 2007.

* cited by examiner

*Primary Examiner* — James Zurita
(74) *Attorney, Agent, or Firm* — Davidson, Davidson & Kappel, LLC

(57) ABSTRACT

A method for selling time-based inventory over a communications network includes permitting a seller via a graphical user interface to define a total time to be sold for a time based-inventory; permitting the seller via the graphical user interface to define a sales time interval amount smaller than the total time to be sold; dividing the total time as a function of the sales time interval amount so as to define a plurality of time intervals of the total time; and selling the plurality of time intervals via the communications network. A further method for selling time-based inventory over a communications network includes permitting a seller via a graphical user interface to define a total time to be sold for a time based-inventory; permitting the seller via the graphical user interface to define a sales time interval amount smaller than the total time to be sold; dividing the total time as a function of the sales time interval amount so as to define a plurality of time intervals of the total time; and selling the plurality of time intervals via the communications network.

15 Claims, 9 Drawing Sheets

ENTER TIME INCREMENT TO BE SOLD: _____ ← 42

OR

PERMIT BUYER DEFINED BIDS TO OPTIMIZE VALUE ← 44

ENTER DESCRIPTION OF RIGHT BEING SOLD _____

↑
46

ENTER START TIME FOR BID _____

ENTER END TIME FOR BID _____

ENTER PRICE _____

SYSTEM AND METHOD FOR SELLING TIME-BASED INVENTORY

This claims the benefit of U.S. Provisional Application No. 60/799,998 filed May 12, 2006, and U.S. Provisional Application No. 60/850,167 filed Oct. 5, 2006, the disclosures of all of which are hereby incorporated by reference herein.

The present invention relates to a method and system for permitting time-based inventory to be sold.

BACKGROUND

Time-based inventory ("tbi") is defined herein as a plurality of time quantities offered for sale with a fixed start time and a fixed expiration time, the time quantity being associated with a right and the time quantity being valueless or expiring after the fixed expiration time. Such inventory may include for example: (1) a time quantity for a location, such as a stadium, tennis court or seat; (2) a time quantity for use of a good, such as a car or restaurant; or (3) a time quantity for use of a service, such as radio broadcast time or cleaning services. Advertising intervals on radio or TV thus fall within the definition of time-based inventory.

Selling of such time-based inventory traditionally has been accomplished by scheduling and offering such time-based inventory based on predefined schedules.

Auction platforms for goods and services are well known. E-Bay for example permits sellers to auction off goods and services, as well as time-based inventory. A seller for example can auction off a basketball court time interval from 10:00 am to 11:00 on a Saturday on E-Bay. A TV advertising interval for the Super Bowl for example may be auctioned off or sold on E-Bay.

SUMMARY OF THE INVENTION

The present invention provides a method for selling time-based inventory over a communications network comprising:
permitting a seller via a graphical user interface to define a total time to be sold for a time based-inventory;
permitting the seller via the graphical user interface to define a sales time interval amount smaller than the total time to be sold;
dividing the total time as a function of the sales time interval amount so as to define a plurality of time intervals of the total time; and
offering to sell the plurality of time intervals via the communications network.

The present invention also provides a system for selling time-based inventory comprising: a server receiving instructions from a seller of time-based inventory to set a total time to be sold for a time-based inventory, the server also receiving further instructions from the seller to set a sales time interval smaller than the total time to be sold, the server determining a plurality of time intervals of the total time as a function of the sales time interval; the server permitting display of the plurality of time intervals to a plurality of potential buyers of the time-based inventory.

The present invention also provides a method for selling time-based inventory over a communications network comprising:
permitting a seller via a graphical user interface to define a total time to be sold for a time based-inventory;
permitting a plurality of potential buyers to define a sales time interval amount smaller than or equal to the total time to be sold and to submit offer prices associated with the sales time interval; and
maximizing a value for the total time to be sold as a function of the submitted offer prices.

The present invention also provides a system for selling time-based inventory comprising a server receiving instructions from a seller of time-based inventory to set a total time to be sold for a time-based inventory, the server also receiving further instructions from a plurality of potential buyers to define a sales time interval smaller than or equal to the total time to be sold and to submit offer prices associated with the sales time interval, the server maximizing a value for the total time to be sold as a function of the submitted offer prices.

The present invention also provides a time-based inventory selling system comprising a server providing an interface for a plurality of sellers of time-based inventory, the server permitting a first of the plurality of sellers to define first time intervals of a first time-based inventory and permitting a second of the plurality of sellers to define second time intervals of a second time-based inventory.

The present invention also provides a graphical user interface comprising a display permitting a seller of time-based inventory to set a total time to be sold, and to choose at least one time interval, a sale of the time-based inventory capable of being conducted as a function of the time interval and the total time to be sold.

The present invention also provide a graphical user interface comprising a display permitting a seller of time-based inventory to set a total time to be sold, and a further display permitting a potential buyer to define a time interval smaller than or equal to the total time to be sold and to submit a bid for the time interval.

BRIEF DESCRIPTION OF THE DRAWINGS

FIG. 6 shows a screen for a potential buyer to use in the automatic optimization embodiment of the present invention;

DETAILED DESCRIPTION

Presently known selling methods and systems for time-based inventory are difficult to manage and do not easily permit the optimization of value for selling of such inventory.

The present invention advantageously provides for selling tbi in an efficient and effective manner. In addition, value can be maximized via an automatic optimization process.

Figure 1:
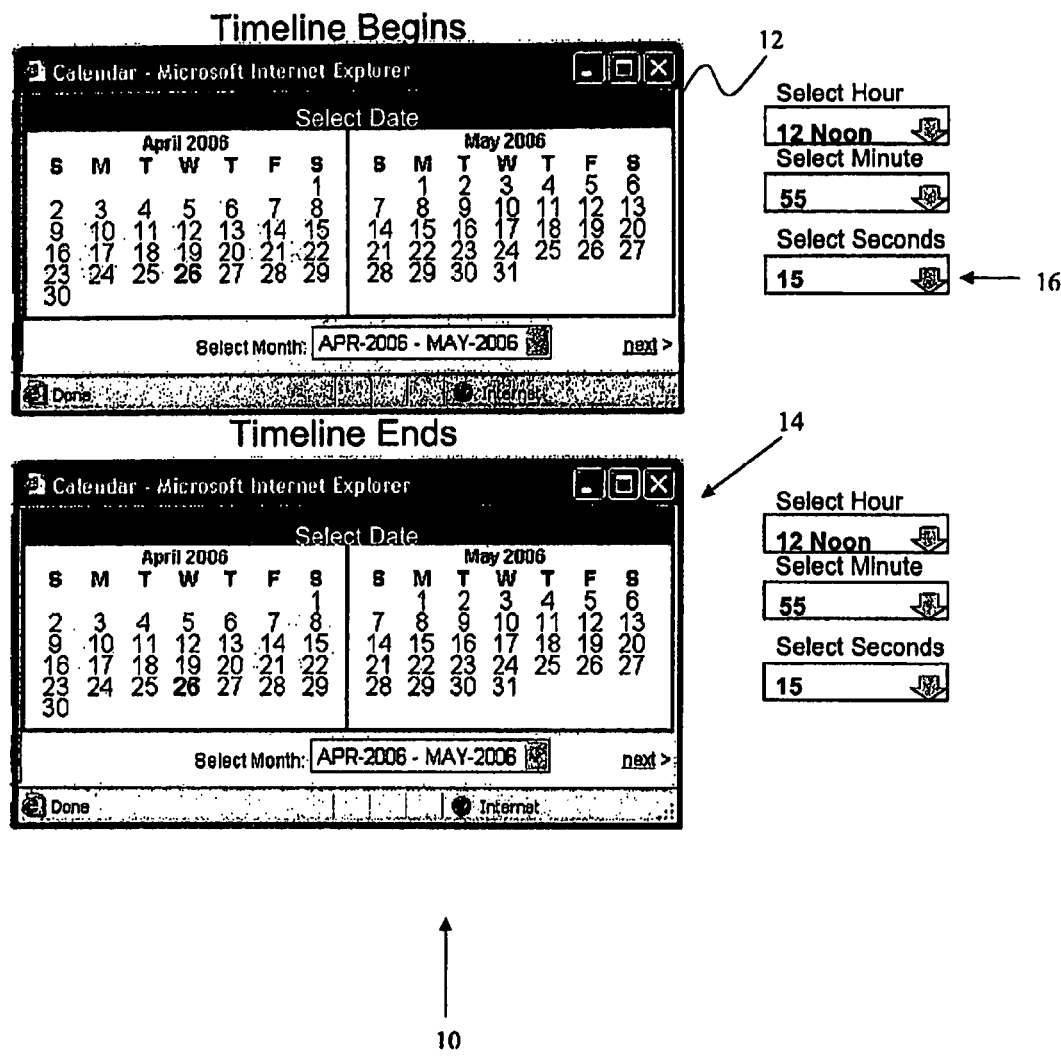
FIG. 1 shows a first graphical user interface for a seller to define a time-based inventory time to be sold.
Figure 4:
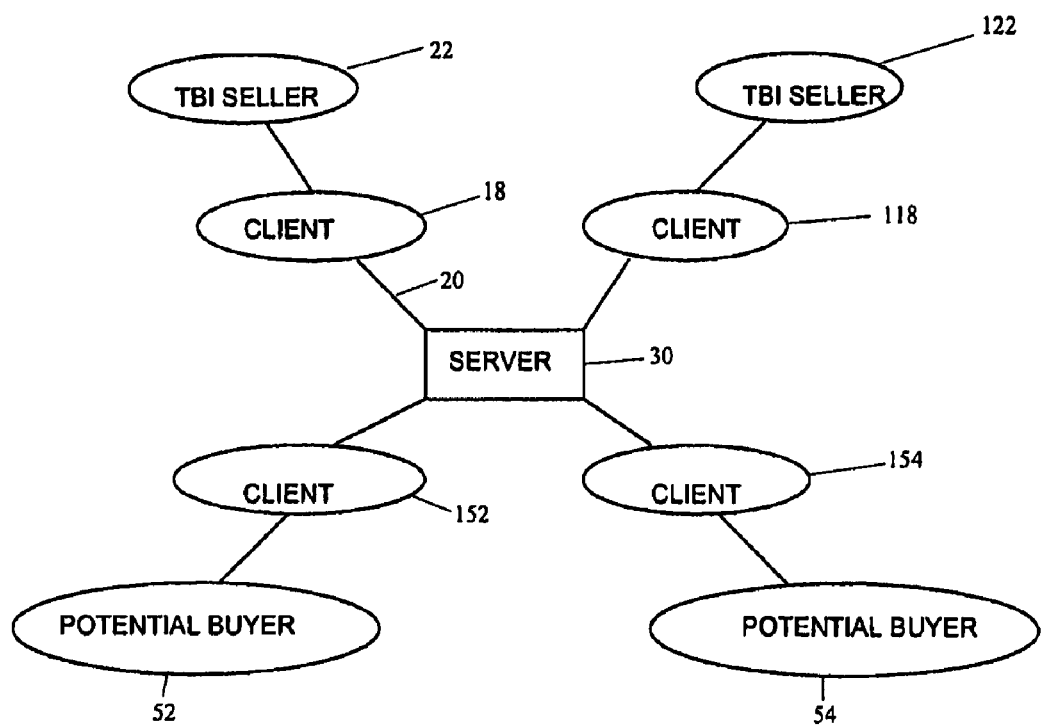
FIG. 4 shows an overview of one embodiment of the system of the present invention.

FIG. 1 shows a first graphical user interface 10 for a seller to define a time-based inventory time to be sold. A seller 22, for example as shown in FIG. 4, can receive a web page on a client 18, such as a personal computer or handheld device, over a communications network 20, such as an IP-based communications network such as the Internet, via a server 30.

The seller 22 can enter in a tbi begin date and end date, so as to define a set interval for sale. For example, the seller advantageously may be offered a start calendar 12 and an end calendar 14. The resolution of the beginning and ending time selectable by buyers may be set by the seller for a particular application, for example down to a fifteen second resolution as shown, for example for advertising spots. For tennis court applications for example the resolution may be set at a half hour or an hour.

Figure 2:
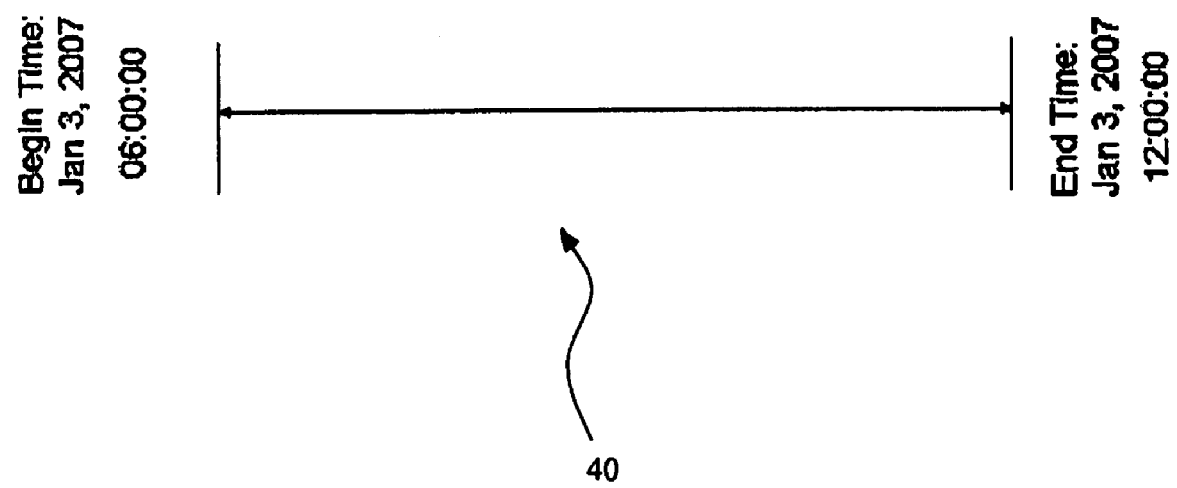
FIG. 2 shows a representation displayed to the seller when the interval to be sold has been defined.

As shown in FIG. 2, the seller can be provided a graphical representation 40 of the tbi once these dates have been entered, preferably in the form of a timeline.

Figure 3:
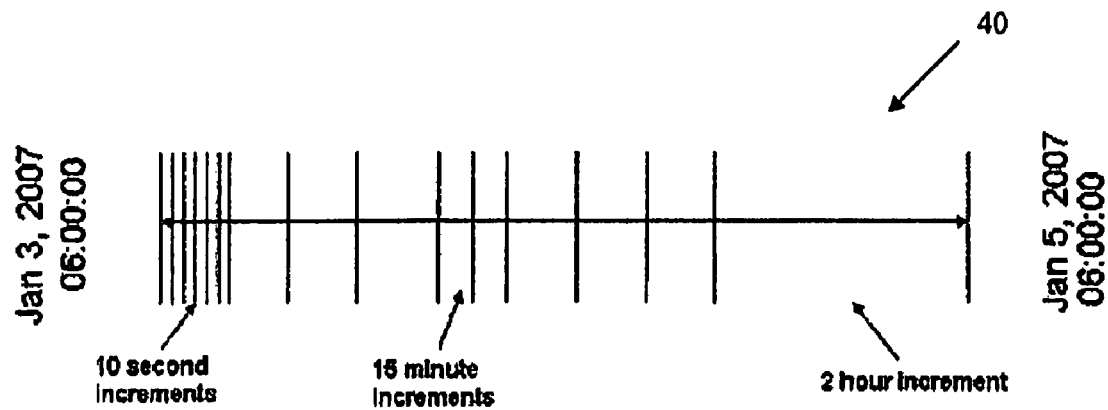
FIG. 3 shows a further screen shown to a seller to define the intervals to be sold for the time to be sold, or to permit automatic optimization.

FIG. 3 shows a further web page 40 which permits the seller to choose between two embodiments of the present invention: (a) selling the tbi using seller defined time intervals, or (b) permitting buyers to define the time intervals desired.

In a location 42, the seller can choose the resolution R of the time intervals to be sold for the total time to be sold (the resolution R typically being smaller or equal to than the resolution provided for the beginning and end times in FIG. 1). For example, 10 second, 15 minute or 2 hour intervals can be selected to divide the timeline and define the time intervals. If total time T divided by R is not an integral number, the left over time smaller than the resolution R at the end of the timeline may be discarded or sold separately as a smaller time interval. For example, if the total time to be sold is ten minutes, and a resolution R of three minutes is selected, three three minute intervals and one one minute interval may be defined for sale.

The seller may also in this web page or another web page provide a description of the right being sold at location 46, for example tennis court time for a tennis court located at 85$^{th}$ and Amsterdam in New York City. This is for use in describing the right to the buyer.

However, predefined descriptions could also be provided, for example, to create a marketplace for standardized auctions or selling of similar goods. The sellers for example may choose tennis courts in the 10024 Zip Code, so that buyers would not necessarily know which exact tennis court was being offered. Such tbi marketplaces preferably are located on a centralized website, for example called rbidr.com. However, they may be a standalone website as well, called for example 10024tennis. This also thus describes the right to the buyer.

However, it is understood that the tbi to be sold is always inventory, and thus in the possession of the seller, so that the seller is never selling a right which does not yet exist or which the seller does not own. For example, if someone were selling time for a particular basketball court on West 85$^{th}$ Street and Amsterdam and did not have the right to the basketball court yet, but rather maybe only an expectation of getting the right in the future, that seller would not be selling time-based inventory. Thus a seller of tennis courts in the 10024 zip code will have the actual right to times on various tennis courts, and will sell that inventory (even if the buyer may not know exactly for which court time is being purchased).

FIG. 3 also shows that the server 30 can provide a graphical representation of the timeline 40 of FIG. 2 with the intervals selected.

If the timeline is used with buyer-defined bids the seller can click on section 44, which will be described hereafter with respect to FIG. 8. This can permit the seller to use a maximization method of the present invention.

Once the seller has defined the total time to be sold and divided the timeline, a graphical user interface can be provided for buyers to begin purchasing the time, as will be described.

FIG. 4 shows an overview of one embodiment of the system of the present invention, in which a plurality of sellers 22, 122, . . . with clients 18, 118, and a plurality of potential tbi buyers 52, 54 with clients 152, 154 can access the central server 30 via the communications network 20.

Figure 5:
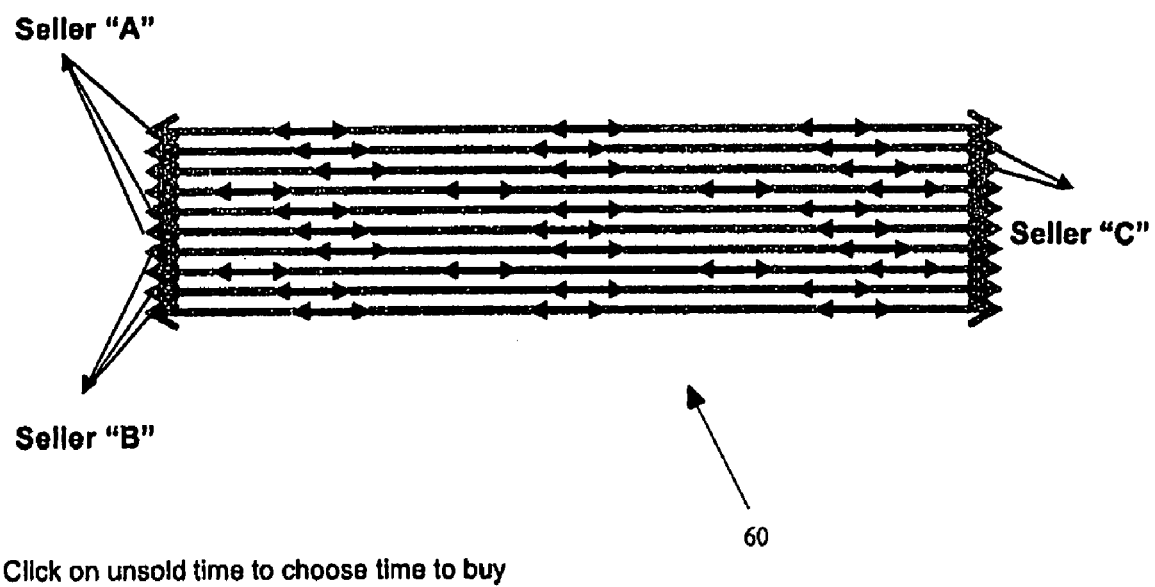
FIG. 5 shows a representation of a marketplace for a plurality of sellers of tbi created with the present invention.

As shown in FIG. 5 this can permit the formation of a marketplace 60 of tbi, for example tennis courts in zip code 10024, sold by a plurality of sellers 22, 122, . . . , which can be displayed graphically on a website such as the centralized website. For example the arrows can indicate which times are already sold, and a potential buyer 52, 252 can access the marketplace and seek to purchase the unsold time intervals.

The price for a time interval can be set by the seller, by the buyer in an auction, or a combination of both. Thus each time interval could show a cost set by the seller when the buyer clicks on the time interval to buy. The seller can set the price for each interval, for example after the step shown in FIG. 3.

In a preferable embodiment, the marketplace is an auction, so that potential buyers can submit bids for the time intervals. Thus, the arrows in FIG. 5 could just indicate which intervals already have bids, and the non-arrowed portions could be intervals where no bids have been submitted. The buyers thus can submit further bids for the time intervals where bids have already been received.

The auction can close a specific time, so that for example an auction for time intervals for Jan. 20, 2007 can close a week earlier at midnight Jan. 13, 2007.

In another preferable separate auction embodiment of the present invention, a seller can leave the tbi un-intervaled, so that the potential buyers can define and bid on time intervals and the server 30 can optimize the value, for example monetary value, to the seller.

FIG. 6 shows a screen for a potential buyer to use in the automatic optimization, i.e., maximization embodiment of the present invention. The buyer can choose the amount of time to be bought from the total time, so that the times are within the total time. The potential buyer enters in a start time and end time for the bid, and a price.

Figure 7:
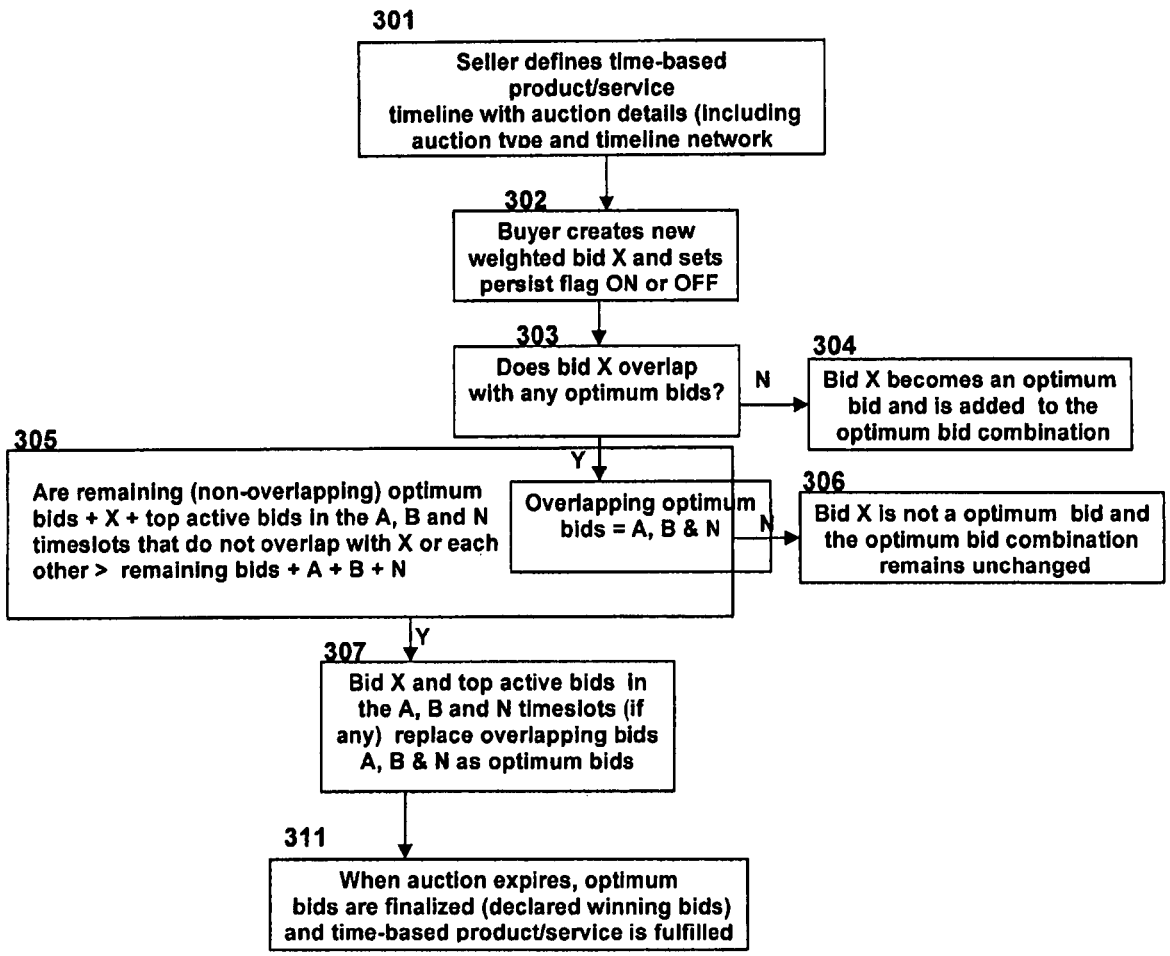
FIG. 7 shows a flow chart for automatic optimization of a time-based inventory to be sold.

FIG. 7 shows a flow chart for automatic optimization of a time-based inventory to be sold.

In step 301, the seller defines the timeline, for example as with respect to FIGS. 1 and 2 above. The seller can also set weighted selection criteria, such as seeking to maximize monetary value, or some other value. A potential buyer in step 302 then can define a time within the timeline (for example using a calendar) and submit a bid, by giving a weight to the time selected, for example a monetary value. The bids which are in line to be accepted when the auction closes at a time set by the seller are called optimum bids, and define an optimum bid combination. Active bids which however are not optimum bids at the present however are kept in reserve, as they may become optimum bids as new bids are presented.

In step 303, if the time range for the bid does not overlap with any other bids, the bid becomes an optimum bid and is added to the optimum bid combination in step 304.

If the time range of the bid does overlap with other optimum bids in step 303, the server is queried in step 305 if the remaining non-overlapping bids+the submitted bid+any other active bids which would them fit into the timeintervals which do not overlap with the submitted bid or each other is greater than the existing optimum bid combination. If so the program causes the new combination to replace the existing optimum bid combination in step 307. If the submitted bid results in an equal value to the existing optimum bid combination, the bid may not be accepted in step 306 to give first bidders an advantage. In step 311, the optimum bids are finalized.

As a simple example, rbidr.com, a centralized website, is selling ten hours of tennis space on Tuesday from noon to 5 pm at West 85$^{th}$ Street and Amsterdam, and uses the optimization software of the present invention. The auction closes at Monday noon. On Sunday, bidder1 bids ten dollars for noon to 2 pm, and this becomes an optimum bid. Bidder 2 bids 20 dollars for 1 pm to 3 pm, and this replaces the bidder1 bid to become the optimum bid. The bidder1 bid becomes active. Bidder 3 bids 10 dollars for 3 pm to 5 pm, and the bidder2 and bidder3 bids do not overlap and become the new optimum bid combination. Bidder4 then bids 25 dollars for the time interval from 2 pm to 4 pm. Since the bidder1+bidder4 combination of $35 is greater than the existing optimum bid combination of $30, this becomes the new optimum bid combination. (Had bidder4 only bid $20, as in step 306 the bid combination would not be accepted. However, this step can be changed for example so that the bid would have been accepted, for example because a first bidder, bidder1, was in the new proposed combination.) When the auction closes at Monday noon, the optimum bid combination can be published on the website.

The optimization program thus permits the seller to receive maximum value (whether monetary or not, such as points for a game).

Figure 8:
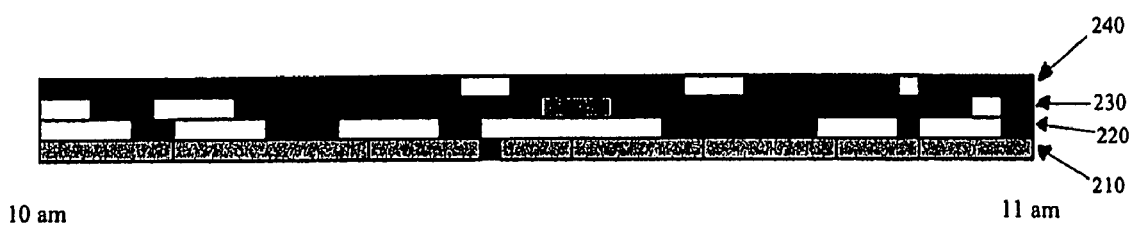
FIG. 8 shows a representation of the tbi sold via both duration and consumtion criteria.

FIG. 8 shows a further embodiment of the present invention that are both duration and consumption based. Weightings may be applied to permit for example, secondary, tertiary and further options to be sold together with the time. For example, in web advertising, the present invention can be used to sell advertising based on both time and the number of clicks generated by the website.

For example, in an auction, bidder1 is seeking to buy 10,000 impressions of advertising from 10 am to 11 am on a website and bids $0.02/impression for a ten minute interval from 10:00 am to 10:10 am. However, the website typically receives 30,000 impressions during that time. Further bids for the same time may then be accepted, so that bidder2 bidding to place an ad from 12:30 pm to 1:30 pm for 5,000 impressions bidding $0.01/impression could have the bid accepted as a secondary option. Thus when bidder1's impression limit is met, the bidder1 ad can be removed and bidder2's bid shown.

For example, line 210 can represent the winners for the time intervals, based for example also on price per impression and number of impressions. Thus, someone who bids $0.02/per impression for a ten am to 10:07 time interval for 10,000 impressions could be assigned that time interval over someone who bids $0.025/impression for 10:00 am to 10:10 interval for 5000 impressions, based on a weighting for the number of impressions.

The bids can specify a fulfillment option of primary spot only, or allow for placement in a non-primary spot, for example after someone else's impressions have been met.

Weightings also can be applied by the buyer, for example price per impression and price for click through.

If the bids permit secondary placement, the non-primary bidder can be assigned to the secondary spot. Thus, if the bids are selected on price per impression, the 10:00 am to 10:10 am time interval would be filled by the $0.025 bidder, and then after 5000 impressions have been met, the $0.02 bidder's ad would be placed on the web page, as indicated schematically in line 220. tertiary and further bids can be placed at lines 230, 240.

As time expires on the website, the last bid being fulfilled with impressions may be only partially complete. In this case only the partial product/service is recorded and billed, so that for example if at the end of 10:07 only 8,999 of the 10,000 impressions have been fulfilled, the bidder is charged only for those impressions.

This embodiment of the present invention advantageously permits further weightings such as price per click to be applied as well.

Another simplified example of a duration and consumption based embodiment would be selling basketball time based on monetary value as well as winning score level. A bidder could submit a bid for a basketball game from 1 pm to 2 pm with the winning score level set to 10 points. A secondary bidder might bid a lesser amount for the same time for a game to 20 points, but would be able to show up from 1 pm to 2 pm, and if the winning bidder's game ended early, say at 1:15, the secondary bidder would get to the court for the remaining time.

Figure 9:
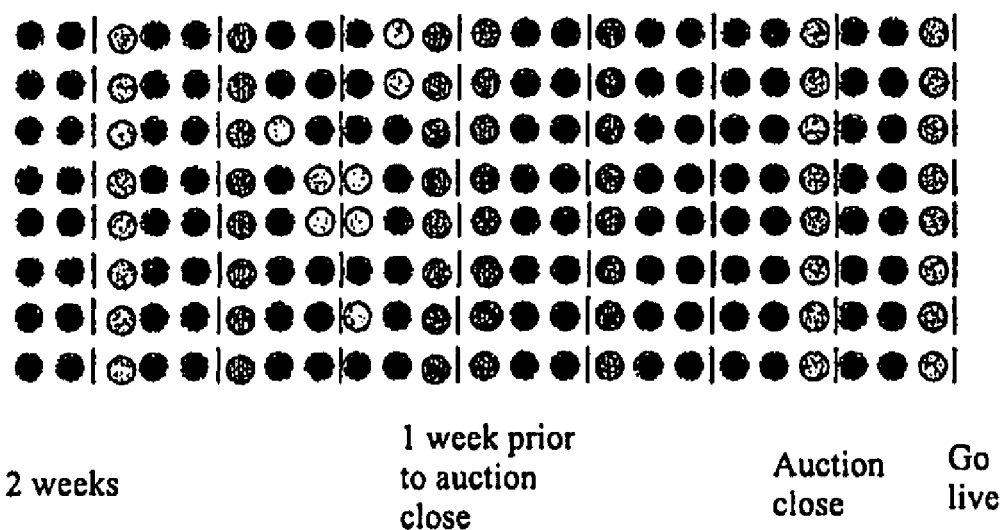
FIG. 9 shows a representation of rules applied to the time-based inventory being sold.

FIG. 9 shows a representation of rules applied to the time-based inventory being sold, so that for example inventory can be sold in different ways at different times.

For example, the dots can represent tbi, for example radio advertising intervals. A number of the intervals can be sold via a sales force, but if not sold within two weeks prior to auction close, the intervals are placed on a website for sale at a certain price. If not sold within one week prior to auction close, the unsold intervals can be placed at auction on a website. The rules can be associated with each interval individually, or as a group.

Examples of Rules can be that during the life of the rule, the designated inventory may:

. . . only be sold by the telesales team
. . . will be sold at auction with a $100 minimum bid.
. . . will only be sold together as a block
. . . will be sold at a 10% discount
. . . will be marketed by an online advertising campaign
. . . will only be available via the web channel at a fixed price
. . . will only be sold to preferred buyers The following are three examples showing advantages of the present invention.

EXAMPLES

Example 1

Basketball Courts in NYC

Steve Jones is the facilities maintenance supervisor for District 3 in Manhattan. District 3 is made up of 12 schools on the Upper West Side, including 4 middle schools and 3 high schools. Steve is constantly fielding queries from individuals and various organizations about using the gyms in the District 3 schools during off hours, especially in the winter months. Apparently, there is a significant shortage of indoor basketball courts in NYC, and there is strong competition among adult and youth leagues for court time.

Steve wants to make the gyms available but managing access and security issues makes it a real headache. There are costs associated with having security on call, electricity, oversight, liability and janitorial. Steve has been given discretion by his higher-ups to manage the use of the facilities any way he sees fit, so he decides to use the present invention to manage gym usage and earn revenue.

Steve goes to www.rbidr.com, a website according to the present invention, and establishes a seller profile. In his profile, he describes the district, the school locations, and posts a few pictures of the basketball courts. For each court, he creates a timeline. He decides he will try rbidr.com for 1 month, so the timeline for each court is made to last a month. Steve blocks out the time that school is in session, and the times of day the courts will not be available to the general public.

Rbidr offers Steve a variety of seller tools that he considers. First, he sets up his profile and timeline, and Steve is informed that he can create an association, or network, of the timelines representing the gyms in his district. This gives him the ability to designate the gyms as 'equivalent' to one-another. Anyone seeking to purchase gym time is buying time from the entire network, not from a specific location. Because all the gyms in Steve's district are within 2 miles of each-other, Steve assumes that buyers will not care which specific gym they are 'leasing', and that rbidr can manage availability and assign buyers in the most efficient manner possible.

The rbidr seller interface then asks Steve whether he wants to define specific intervals of time to be sold (e.g. 1 hour blocks), or would rather leave the timelines 'open' and apply rbidr's optimization method described above in combination with an auction sales method. Steve decides that he will sell 1 hour blocks of time at a fixed price on weekday evenings and Saturday afternoons, but use rbidr's optimization method and auctions all day on Sundays.

Steve designates the preferred method of payment as credit card or paypal since he does not want to deal with cash. Each buyer will receive a confirmation code against which Steve, or his designated representatives, can make sure the gym time has been reserved and paid-for properly. Rbidr allows Steve to customize the confirmation codes to make the process more manageable. Steve decides that the confirm codes will include the school name, the date & time purchased and a unique identifier. (e.g. 'PS191010707xKr3r45')

The rbidr system has a built-in feedback system which will solicit feedback from both buyer and seller at the end of each transaction. Steve decides to forego any in-site marketing such as banners and promotions. He figures that people who want to use gym time in Manhattan will know how to search by category and/or keywords. He also decides not to pay additional premiums and have his listings promoted with bold type, colorful backgrounds, etc.

After devoting real effort into entering all the data and setting up the gyms and timelines in the manner desired, Steve is ready to make his network of timelines live. Rbidr.com charges Steve a listing fee based on the number of timelines he has set-up and the number of add-on features he has selected.

Ernie Smith has been playing basketball every Sunday morning in PS6 in District 3 for seven years. Ernie sees Steve's website in a search engine and clicks the link and is brought to a login page. He enters the username and creates a password, and he sees Steve's timeline listings. Ernie realizes that not only will he have to win an auction to gain gym time, but that he won't even know which specific gym it will be in District 3 until he wins.

Ernie views the timeline network zooms in on the calendar for following Sunday. He sees that there is 1 bid for the 9-11 am time interval. Since there are 7 gyms available, Ernie knows that until more of the bidders come to rbidr.com and place bids, he will be able to secure gym time very cheaply. Ernie sees that the auction for next Sunday closes at exactly 11 pm on Wednesday evening, roughly 4 days before he will use the gym and roughly 7 days from now. Ernie selects a feature that lets him track the auctions in this timeline network in his profile, and also sets up an alert to come back and check out the situation before the auction closes.

Two days later, Ernie logs into rbidr.com again and accesses Steve's timeline network to see if there has been any more bid activity. There are now 6 bids that overlap with Ernie's desired 9-11 am time interval. He can see that the bid amounts are low, and that he could easily win an interval for as little as $50. Ernie figures he can take up a collection from his friends once a week, and easily raise as much as a $100 if he had to. Ernie decides to put in a bid.

Because Steve has set up the network to use optimization method and auctions, Ernie has complete flexibility to choose the begin and end time for his desired 'lease' of gym time. He chooses exactly 9 am to 11 am and, based on the fact that the existing bids range from $10 to $20/hr (the system calculates and displays the rate per hour), Ernie places a $25/hr bid ($50 total). The system informs him that he is presently a winning bidder and that if circumstances change, he will be informed by email notification. (The system also allows SMS alerts.)

The system asks Ernie to create a profile and designate credit card information. He is given the option to change the system generated username and password to one that is more customized to his liking.

Two days before the auction is designated to close, Ernie receives the system alert, but decides not to log-in again. He figures if he is knocked out of a winning position, the system will notify him, and that otherwise, he will log-in on Wednesday night at 10 pm to review the situation. On Wednesday Ernie accesses rbidr. Ernie sees that there has been some more bid activity and that his bid is presently in $5^{th}$ place. If nothing changes, he will gain access to one of the 7 available gyms. Ernie doesn't feel to secure about the situation, and decides to up his bid by $10/hr to solidify his situation. At 11 pm, Ernie is informed that he has won a 9 am to 11 am time interval for the following Sunday. His credit card is automatically charged the $70 that Ernie bid. The system sends Ernie an email and updates his profile include the winning bid information. He is give the school name and location of the gym he has leased and a confirmation code according to the convention established by Steve.

On Sunday, Ernie and his friends show up at the designated school ready to play. They show the security guard the confirmation code, and are let into the gym. Steve had provided the security guard with the schedule and all the codes the day before. Ernie and friends play for two hours, and then leave the gym. Another group shows up at 11 am. That night, Ernie logs back in to rbidr, puts in some feedback regarding the condition of the gym and the rbidr experience. For his part, Steve gets feedback from the security guard about the cooperation levels and cleanliness of the winning bidders and offers his own feedback.

Steve checks in on rbidr once a day to see how things are progressing. Through one simple interface he can see all the historical and future schedules. He can also see how much revenue has been earned and run reports on which days of the week and/or which times of the day are most lucrative. He also has the opportunity to see the price points he is achieving on Sundays as compared to the rest of the week. All of this data lets Steve manage price points and other data points in ways that make sense. Steve can also see all the feedback on how the overall system is running and make adjustments accordingly.

Example 2

Truck Leasing

The Seller is a B2B truck leasing company and it has systems that:

a) have GPS devices connected to the Internet in every truck
b) a scheduler that assigns trucks to jobs
c) sophisticated communications network that keeps a central hub in constant communication with the trucks The company has software that estimates load times, takes into consideration load weight, drive times, fuel costs, etc.

The company has a fleet of 200 large trucks is leases nationwide for B2B hauling services. It has a very wide customer base, but has to keep tight control over its fleet because fuel costs and competition are eroding its margin.

In any given week or month, Company inevitably has cancellations and other factors that leave it less than 100% capacity. Additionally, there are segments of the marketplace where Company suspects its pricepoints are too low. Customers have over-leveraged relationships and the sales/marketing department has overestimated the competition.

Company makes a deal with rbidr to assist in selling surplus and also to provide some sanity to its pricepoints. Data from the scheduling system fills up each timeline, with availability dynamically defined by holes in the schedule. As dates are pumped into the scheduling system from the market department, rbidr's software updates with availability time constantly changing for each truck. Each timeline also includes integration with GPS mapping software, so the timeline description not only describes the capacity and specs of the truck, but also shows exactly where the truck is at any given moment. The scheduling data also shows where the truck is expected to be with each job.

Based on the data available to it, rbidr is able to offer a truck's availability as well as a geographical range it must be within when it 'ends' the auctioned job. In this way, the truck can still be available to make it to the next destination on the scheduler. The range of usage is dynamically determined by data from the scheduler and the GPS mapping software, and is visually represented by a colored arc or band on the map.

Company launches its rbidr custom version within www.company.com. It informs all of its customers of the new service to sell surplus time, and also conducts are market campaign towards what it feels are potentiall audiences. Company also intentionally leaves additional intervals open—that might have ordinarily sold at proscribed pricepoints, and keeps track of them to see what the auctions fetch.

Because of the new software system, Company tells its marketing department to stop marketing efforts for open intervals 2 weeks. Company systems cause rbidr to automatically 'open' auctions for unsold intervals exactly 2 weeks before the rental is to occur. Based on its experience, Company decides to close the auctions 5 days before the lease, giving buyers enough time to arrange for alternative approaches/deal with the consequences should they fail to win the bid. Company also sets a minimum bid, which might also be dynamically calculated based on data available. They will obviously not want to lose money on the transaction, so the minimum bid might be the break-even point, or slightly above.

Company requires that all bidders have an open account with them, perhaps extending credit to preferred customers. They also use a username and password paradigm so they can control who they are dealing with.

Buyer's Perspective: Two Guys department store is a 5 store chain in Georgia and S. Carolina. Two Guys has used Company to move product from its main warehouse to the stores, and occasionally to move product between stores. They have 2 trucks of their own, but occasionally circumstances arise where they need more hauling capability.

Two Guys goes to Company.com to see if they can arrange for additional hauling capacity. Based on an intense schedule of deliveries, they need trucks to pick up merchandise at their warehouse and bring them to the stores once per day for seven straight days. They work out a schedule of their needs, and then plug the parameters into the such criteria. They find timeintervals of availability on company.com/rbidr and bid against others for the right to lease the trucks.

When Two Guys wins the bid, rbidr feeds the scheduling software just as if the transaction was a conventionally sold and scheduled by company. The truck shows up and the designated time and provides the services intended. The Two Guys' account w/Company pays for the transaction.

Example 3

Online Advertising

Earl is a publisher of a bowling enthusiast's website: www.bowlingiscool.com. On his site he has bowling news, a blog, instructional video clips, FAQ's and message boards covering all topics related to professional and amateur bowling. Earl also has a small online store where he sells wrist grips, shoes, socks, balls, wax and a host of other bowling equipment. Until recently, Earl was earning additional revenue by having bowlingiscool.com participate in an online advertising network. The network signed-up hundreds of modestly popular, but highly focused, websites ('publishers') and then sold banner advertising on the sites to willing advertisers. The network gave tools to the advertisers to build and manage campaigns within the network, and charged fees based on overall impressions (the number of times a banner appears) or click-through rates (the number of times a user clicks-on the banner). At a high level, the network assured Earl that the advertisers in the network were of a certain quality, but Earl would never actually know in advance who was advertising on his site. In exchange for the service, which included the technical delivery of the ads, the network was taking more than 50% of the fees paid by the advertisers. Bowlingiscool.com is too small a venture for Earl to deal with selling and serving banner advertising on his own, but he also was unhappy with the downstream and somewhat powerless position of being a small publisher on a large network. He also thought that advertising on bowlingiscool.com was probably pretty valuable to a select group of merchants because of its differentiated audience, and that some of that value was lost by the leveling effect of the network.

Earl decides that he wants to try the online advertising capabilities of rbidr.com. He navigates to www.rbidr.com and establishes a seller profile. After reading how it works, he realizes that rbidr.com employs a totally different process for selling online advertising than the networks. The rbidr.com wizard walks him through establishing 'timelines' that correspond to specific pages on his site on which he intends to sell advertising. It also has him provide general background and information regarding bowlingisfun.com. Based on usage statistics Earl has from his hosting company, Earl decides that he will start by setting up timelines that relate to 3 pages: the Home page, his blog page, and the 'Improve Your Game' forum, the most popular of the message boards. The wizard has him describe the content on these pages in detail, as well as go over the anticipated traffic and demographics. Earl also specifies where the banner will be placed on the page, the dimensions, and any technical limitations. By the time he is finished, Earl has established 3 distinct timelines, which he names individually according to the corresponding page. He also links the timelines together as a 'network' and gives the network the name of his site: bowlingisfun.com.

In terms of establishing how the three timelines are to be sold, Earl is given a myriad of options to choose from. He can make the three pages equivalent, which will mean a successful buyer might have his/her banner displayed on any one of the three pages. He can ensure they are distinct, so that a buyer knows exactly the page where the banner will appear. Earl can turn on additional features such as rbidr's optimization method, which will allow open-ended bidding (not specific intervals defined in advance), and persistent campaigns, which allows advertisers to present a series of banners to a single user as the user navigates from page to page. Earl can also choose whether to review all banners himself, or to have rbidr review them for him based on rules and qualifications he sets. (For example, Earl certainly does not want any vulgarity or sexually explicit materials, nor does he want competition from those selling certain types of bowling accessories.)

Once Earl establishes the parameters set out by the wizard, including other considerations in addition to the ones listed above, he then publishes the timelines and makes them 'live'. As part of the purchase process, successful buyers upload the banners to be displayed in file formats pre-designated by Earl and rbidr. The file goes through the desired quality assurance process, and then—once cleared, is placed into a production database for ultimate delivery. The rbidr system then serves ads based on the schedule determined by the commerce activities. Acknowledgement and reconciliation occur in automated fashion so that Earl and all successful purchasers can see what actually occurred.

Earl understands that selling online advertising includes another dimension that makes it unique from other tbi. With online advertising, assuming there is technical capability, a buyer can certainly place an ad on a website at a proscribed time of day—but this assumes that there is someone requesting the page in the first place. The added dimension here is the number of users requesting pages (impressions) of the publisher website. In other words, the home page of bowlingisfun.com might be requested thousands of times per day. Earl is not only selling time blocks on each of these pages, he is selling page views in addition to time blocks. Finally, Earl has one last dimension upon which to earn revenue, and that is the number of users who actually 'click on' the advertising. So, while thousands of banners displayed within a proscribed time interval has a certain value, the prevalence of users actually clicking on those banners has an even greater value. Rbidr.com provides Earl with the means to unlock all that value. (Earl may also offer guarantees with his network to support a certain number of impressions per day—and if it doesn't happen, Earl may offer some rebate or discount.)

By using rbidr.com's optimization method, the system calculates the winning 'snapshot' of bids for a predetermined interval of time, say 24 hours. In this scenario, Earl desires that the optimization method factor in two distinct bids from the buyer, the impressions bid and the click-through bid, as well as the time interval in which the advertising has been requested to be displayed.

For example, a prospective buyer requests 2000 impressions at an impression bid of $1, and a click-through bid of $3, between the hours of noon and 2 pm. If he wins the bid, every time Earl shows a banner for this bidder he makes $1. Every time a user clicks on a banner, Earl makes an additional $3. Earl has between Noon and 2 pm to display the banners.

rbidr then takes the time intervals established by the winning bids as a baseline template to carve up the 24 hour interval so the system can assign secondary and tertiary winners as well.

For example, assume the winning bids establish the following time intervals:

12 am-1 am
1 am-5 am
5 am-6:30 am
6:30 am-9 am
9 am-12 pm
12 pm-2 pm_$1, $3, 2000
2 pm-3 pm
3 pm-6 pm
6 pm-12 am

In each case, we can assume the winners have defined impression and click-through bids and number of impressions. Only one example is listed above: 12 pm-2 pm_$1, $3, 2000. e.g. the winning bidder from 12 pm to 2 pm will pay Earl $1 for each impression, $3 for each click-through, up to a maximum of 2000 total impressions.

For purposes of determining secondary bids—in this case the banners that will be displayed if and when the winning bidders allotment of intervals are fulfilled—rbidr keeps the time interval breakdown of the winners above, and builds a virtual 'wait list' for impressions to be filled during the designated time slice (e.g. 12 pm-2 pm). The system then looks to see which bidder had the next best winning bid that overlaps in some way with this timeframe. Whenever the bidding closes, rbidr publishes a schedule that says what will happen within each time interval. If the impressions are sold out during a time interval, it will move on to the secondary winner. If those impressions are sold out, or if the time that the secondary bid overlaps ends, then the system moves to the third bidder. However, once the time expires on the interval defined by the winning bid (in this case, at 2 pm), the system resets itself and begins again with the winning bid on the next time interval (2 pm-3 pm). In this way, the seller will always get the best price, and keep selling until the runs out on the interval. This should also attract a wide pool of potential advertisers, with bargains attainable depending on how many impressions actually occur.

Stan sells bowling shoes and is a prospective advertiser on bowlingisfun.com. Stan navigates to rbidr.com and find's Earl's offering through the search mechanism. After looking over the pages offered, and navigating directly to bowlingisfum.com and checking it out, Stan decides that he wants to put some advertising on Earl's home page. Stan bids $0.50 per impression and $1 per click-through for 100 impressions between the hours of 12 pm and 6 pm. Various tools help Stan through this process, and explain how its works. Stan is not obligated to make his bid persist if he is not the winner. Staying in a secondary or tertiary position is entirely at Stan's discretion, however he must decide this before he enters a bid in the first place. If Stan decides that his bid should persist, then his content (banner) automatically goes through the QA process. Also, his credit cards or means of payment is assured up-front. (However, as we will see, Stan is not charged unless some of his banners are actually served.) While Stan is a competitor to Earl, in that he also sells bowling shoes, Earl does not mind this kind of competition—and otherwise sees nothing wrong with Stan's banners.

When the auction closes, Stan finds out he is in 6th place in the 12-2 interval, with 10,000 impressions ahead of him. He finds out he is in 5th place in the 2-3 interval, with 8,000 impressions ahead of him. Finally, he is in 4th place in the 3-6 interval with 11,000 impressions ahead of him.

The winning bid hierarchy on the 12 pm-2 pm interval is as follows: $1, $3, 2000 impressions (winner); $1, $2.50, 3000 impressions (secondary); $0.75, $2.50, 1000 impressions ($3^{rd}$ place); $0.75, $2, 1000 impressions ($4^{th}$ place); $0.50, $1.50, 1000 impressions ($5^{th}$ place); $0.5, $1, 100 impressions (Stan).

For Stan to get any impressions during the 12 pm to 2 pm interval, 8000 impressions need to be sold ahead of him. If the 8000th impression occurs at 1:55 pm, then Earl will only serve Stan ads for the impressions that occur over the next 5 minutes because at 2 pm, the system resets and begins again with the 2 pm winner.

Stan, and all other bidders, only ultimately pay for the impressions that actually occur. Earl will likely want to publish bowlingisfun.com usage statistics on a daily basis to give potential advertisers a sense of how many impressions are supported during the various hours of the day. This will help them understand not only the value of what they are bidding on, but also how best to devise a bid strategy.

This example is exactly as before, but instead of bidding 0.50 & $1 for 100 impressions, Stan ups his click-through bid to $4 and requests 1000 impressions. He also limits the timeframe to 5 to 7 pm. Stan knows that this sort of bid will only get expensive if there are a lot of click-throughs. He won't mind paying a premium because he expects any click-throughs to be very valuable to Stanbowlingshoes.com. After placing this bid, Stan indicates he is using the persistent campaigns feature. The system asks that he indicate the number of banners in his campaign. In this case Stan has 3 distinct banners lined-up. The system then asks that Stan upload all three banners and indicate the order in which he desires them to be displayed.

Stan ends up being the secondary bidder during the 5-7 pm timeinterval with every single one of his impressions met. So far, Stan's cost is $500 (0.50×1000). With the persistent campaigns feature, Earl tracks user sessions as they traverse bowlingisfun.com. Every time a user on the site moves from one page on the site to another, Earl's server is aware of the movement. By requesting a persistent campaign, Stan has effectively asked that Earl inform him (rbidr) of these movements so that he show user's his banners in sequence. Stan hopes that he will be able to build a message to the user over a series of banners, raising the potential for a qualified click-through.

What is claimed is:

1. A method for selling time-based inventory over a communications network comprising:
    permitting a seller via a graphical user interface to define a total time to be sold for a time-based inventory;
    permitting the seller via the graphical user interface to define a sales time interval amount smaller than the total time to be sold;
    dividing the total time as a function of the sales time interval amount so as to define a plurality of time intervals of the total time; and
    offering to sell the plurality of time intervals via the communications network.

2. The method as recited in claim 1 further comprising receiving bids for the time intervals so as to define an auction.

3. The method as recited in claim 2 further comprising permitting the seller to set an auction close time, the auction close time being before the start of the total time to be sold.

4. The method as recited in claim 1 further comprising permitting a second seller via the graphical user interface to define a second total time to be sold for a second time-based inventory.

5. The method as recited in claim 4 further comprising selling the time-based inventory and second time-based inventory together so as to define a marketplace.

6. The method as recited in claim 1 further comprising permitting the seller to submit a description of a right associated with the time-based inventory.

7. The method as recited in claim 1 wherein the time-based inventory has at least one associated rule defined by the seller, the time-based inventory being sold differently when the rule is applied.

8. The method as recited in claim 1 wherein the time-based inventory is sold based both on duration and consumption information.

9. The method as recited in claim 1 wherein the total time to be sold divided by the sales time interval is not an integer so as to define a remainder, the remainder being discarded or sold separately at a smaller time interval.

10. The method as recited in claim 5 wherein a predefined description is provided for the marketplace, the buyer knowing the predefined description but not knowing if the time-based inventory or the second time-based inventory is being offered for sale.

11. The method as recited in claim 1 further comprising providing a buyer graphical user interface to potential buyers, the buyer graphical user interface showing a timeline of the plurality of time intervals.

12. The method as recited in claim 11 wherein the buyer graphical user interface further shows a cost set by the seller or a bid amount by a potential buyer for each of the plurality of time intervals shown on the timeline.

13. The method as recited in claim 12 wherein the cost is shown by clicking on one of the plurality of time intervals of the timeline.

14. The method as recited in claim 1 further comprising permitting the seller to set prices for the plurality of time intervals.

15. The method as recited in claim 14 wherein the seller sets at least one price for at least one of the plurality of time intervals, and after selling at least one of the plurality of time intervals at the price, unsold time intervals are auctioned.

* * * * *